(12) United States Patent
Parkin et al.

(10) Patent No.: US 10,730,151 B2
(45) Date of Patent: Aug. 4, 2020

(54) SYSTEMS AND METHODS FOR AIRFOIL ASSEMBLY

(71) Applicant: UNITED TECHNOLOGIES CORPORATION, Farmington, CT (US)

(72) Inventors: Michael Parkin, South Glastonbury, CT (US); Osamuyimen A. Oyegun, Middletown, CT (US); Joseph Rios, Meriden, CT (US); Thomas J. Horn, Wallingford, CT (US); Micah Beckman, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 629 days.

(21) Appl. No.: 14/571,399

(22) Filed: Dec. 16, 2014

(65) Prior Publication Data

US 2015/0190893 A1 Jul. 9, 2015

Related U.S. Application Data

(60) Provisional application No. 61/923,265, filed on Jan. 3, 2014.

(51) Int. Cl.
*B23P 15/04* (2006.01)
*F01D 5/28* (2006.01)
*B21D 53/78* (2006.01)
*F01D 5/14* (2006.01)

(52) U.S. Cl.
CPC .............. *B23P 15/04* (2013.01); *B21D 53/78* (2013.01); *F01D 5/282* (2013.01); *F01D 5/147* (2013.01); *F05D 2230/23* (2013.01); *Y10T 29/49337* (2015.01)

(58) Field of Classification Search
CPC ........... B23P 14/04; B21D 53/78; F01D 5/282
See application file for complete search history.

(56) References Cited

U.S. PATENT DOCUMENTS

| 5,876,651 | A | * | 3/1999 | Blackburn, Jr. | ........ B32B 37/00 156/307.1 |
|---|---|---|---|---|---|
| 2006/0275132 | A1 | * | 12/2006 | McMillan | ............. B29C 70/222 416/224 |
| 2011/0211965 | A1 | * | 9/2011 | Deal | ....................... F01D 5/147 416/223 R |
| 2012/0034833 | A1 | * | 2/2012 | Schaube | ............... B29C 70/086 442/172 |
| 2013/0220542 | A1 | * | 8/2013 | Parkin | ................... F04D 29/324 156/331.7 |

* cited by examiner

*Primary Examiner* — Moshe Wilensky
(74) *Attorney, Agent, or Firm* — Cantor Colburn LLP

(57) ABSTRACT

A method for assembling an airfoil includes pressing a blade body together with at least one of a blade sheath and a blade cover between a plunger and a die base to join the blade body to the blade sheath and/or the blade cover. The method can include transferring heat from the plunger and/or the die base to at least one of the blade body, the blade sheath and the blade cover to cure an adhesive.

17 Claims, 3 Drawing Sheets

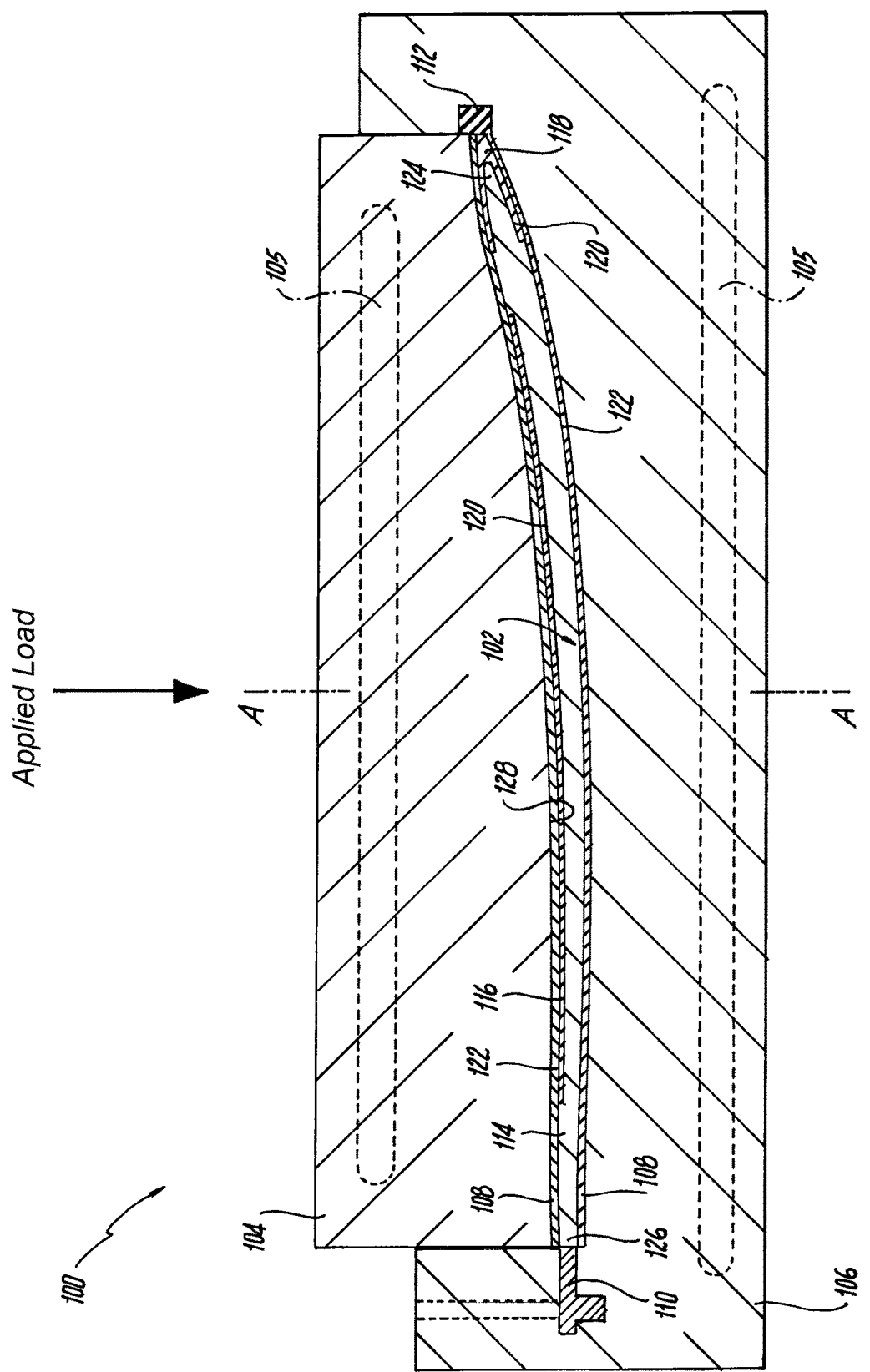

SYSTEMS AND METHODS FOR AIRFOIL ASSEMBLY

CROSS-REFERENCE TO RELATED APPLICATION

This application claims the benefit of priority under 35 U.S.C. § 119(e) to U.S. Provisional Application No. 61/923,265, filed Jan. 3, 2014, which is incorporated herein by reference in its entirety.

BACKGROUND OF THE INVENTION

1. Field of the Invention

The present disclosure relates to manufacturing aerospace components, and more particularly to assembling airfoils, such as those used in gas turbine engines.

2. Description of Related Art

Some aerospace components, such as a fan blade body and a blade sheath and/or a blade cover, are assembled using an adhesive to bond the components together. Traditionally, an autoclave has been used in the manufacturing process to apply pressure and heat to the components being assembled to cure the adhesive. However, using an autoclave to bond a blade cover and/or a blade sheath onto a blade body can be time consuming and not conducive to lean manufacturing principles such as one-piece-flow. Further, the heating rate can be limited due to the fact that the heat transfer mechanism is based on convection of a gas. Generally, a vacuum bag is used to act as a membrane to allow the autoclave pressure to act on the part being cured. Vacuum bagging is typically a manual operation and the bagging materials are often disposed of after each use.

Such conventional methods and systems have generally been considered satisfactory for their intended purpose. However, there is still a need in the art for improved systems and methods for manufacturing aerospace components. The present disclosure provides a solution for these problems.

SUMMARY OF THE INVENTION

A method for assembling an airfoil includes pressing a blade body together with at least one of a blade sheath and a blade cover between a plunger and a die base to join the blade body to the blade sheath and/or the blade cover.

The method can include transferring heat from the plunger and/or the die base to the components being assembled, e.g. the blade body, the blade sheath, the blade cover, and/or foam segments, to cure an adhesive. Transferring heat from the plunger and/or the die base can include transferring heat through conduction. The method can also include applying an adhesive between a broad side of the blade body and at least one of the blade cover and the blade sheath. The method can also include applying an adhesive between a leading edge of the blade body and the blade cover and/or the blade sheath. The method can also include applying the adhesive between foam segments and respective cavities formed in the blade body. The method can include curing the adhesive with heat transferred from the plunger and/or the die base.

In another aspect, the method can include positioning a compliant layer between a broad side of the blade body and the plunger and/or the die base. The compliant layer can be configured to substantially equalize the distribution of pressure applied by the plunger and/or the die base across the broad side of the blade body. The method can also include positioning the blade body on the die base. The die base can oppose the plunger across the blade body along a longitudinal axis. It is further contemplated that the method can include supporting the blade body and at least one of the blade sheath and the blade cover with the die base while pressing the blade body and at least one of the blade sheath and the blade cover.

The method can also include applying pressure to a trailing edge side of the blade body in a chord-wise direction with a cam mechanism for full engagement of a leading edge of the blade body within the blade sheath. In addition, pressing the blade body together with the blade sheath and/or the blade cover can include moving the plunger along a longitudinal axis toward a broad side of the blade body. Pressing the blade body together with at least one of the blade sheath and the blade cover can also include transferring pressure from a plunger surface to a broad side of the blade body in a plane normal to the broad side of the blade body. The method can also include constraining the blade body and the blade sheath with a flexible stopper proximate a leading edge of the blade body.

An airfoil produced by a process as described above, including a blade body and at least one of a blade sheath and a blade cover.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3 is a cross-sectional side elevation view of the system of FIG. 1 with the fan blade of FIG. 2, showing the plunger being pressed downward along the longitudinal axis toward the fan blade to bond the blade cover and blade sheath to the blade body.

DETAILED DESCRIPTION OF THE EMBODIMENTS

Figure 1:
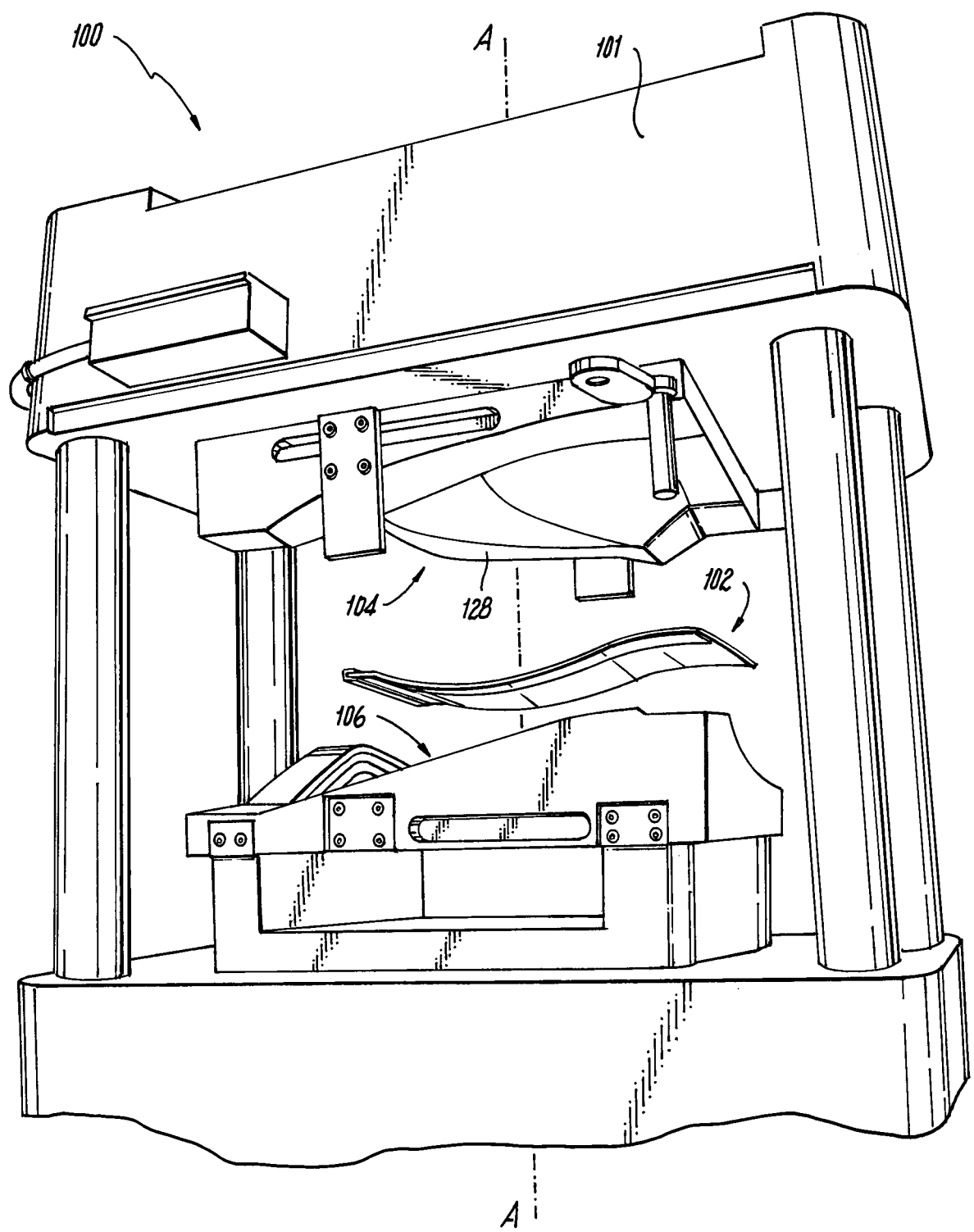
FIG. 1 is a perspective view of an exemplary embodiment of a system for assembling a fan blade in accordance with the present disclosure, showing the plunger and the die base in a platen press.

Reference will now be made to the drawings wherein like reference numerals identify similar structural features or aspects of the subject disclosure. For purposes of explanation and illustration, and not limitation, a partial view of an exemplary embodiment of a system for assembling an airfoil constructed in accordance with the disclosure is shown in FIG. 1 and is designated generally by reference character 100. Other embodiments of systems for assembling airfoils in accordance with the disclosure, or aspects thereof, are provided in FIGS. 2-3, as will be described. The systems and methods described herein can be used to improve bonding between the blade body and the blade sheath and/or blade body and consistency in manufacturing.

As shown in FIG. 1, a system 100 for assembling a fan blade 102 includes a plunger 104, and a die base 106. Die base 106 and plunger 104 include integral heating elements 105, shown schematically, such as electrical, steam or oil heating elements. Plunger 104 and die base 106 are substantially aligned with one another along a longitudinal axis A, with plunger 104 disposed above die base 106 along longitudinal axis A in a first position. Those skilled in the art will readily appreciate that die base 106 and plunger 104 can be contoured to match the contours of fan blade 102, described below. System 100 is disposed within a platen press 101.

Figure 2:
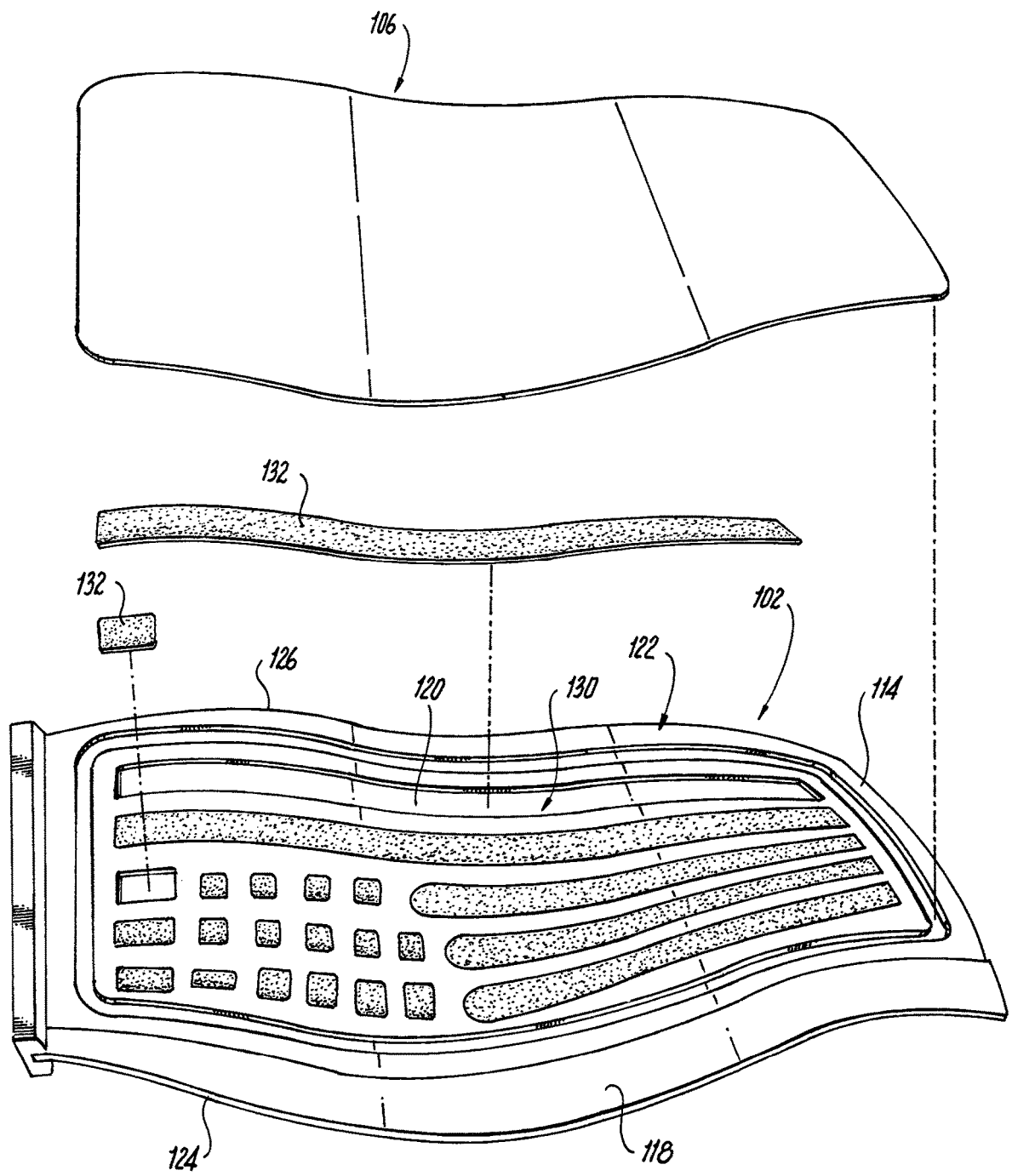
FIG. 2 is an exploded perspective view of an exemplary embodiment of a fan blade assembled in accordance with the present disclosure, showing the blade body, blade cover and blade sheath.

Now with reference to FIG. 2, fan blade 102 being assembled within system 100 includes a blade body 114, blade cover 116 and a blade sheath 118. Fan blade 102 also includes foam segments 132 disposed within respective cavities 130 formed in blade body 114. A method for assembling fan blade 102 includes pressing blade body 104 together with blade sheath 118 and blade cover 116 between plunger 104 and die base 106, described above, to join blade body 114 and blade sheath 118 and blade cover 116 together. Those skilled in the art will readily appreciate that the force applied to blade body 114, blade cover 116 and/or blade sheath 118 can be calculated by multiplying the projected surface area of a broad side 122 of blade body 114 and a desired bonding pressure. The method includes applying an adhesive 120 between broad side 122 of blade body 114 and blade cover 116, and a leading edge 124 of blade body 114 and blade sheath 118. The method also includes applying adhesive 120 between foam segments 132 and respective cavities 130 formed in blade body 114.

As shown in FIG. 3, system 100 also includes compliant layers 108, a cam mechanism 110, and a flexible stopper 112. Those skilled in the art will readily appreciate that compliant layers 108 can be made from any suitable conformable material, such as silicone, other rubber material, or the like. One compliant layer 108 is positioned between a first broad side 122 of blade body 114, including blade cover 116 and at least a portion of blade sheath 118, and die base 106. A second compliant layer 108 is positioned between a second broad side 122 of blade body 114, including at least a portion of blade sheath 118, and die base 106. Compliant layers 108 are configured to substantially equalize the distribution of pressure applied by plunger 104 and die base 106 across broad sides 122 of blade body 114.

Those skilled in the art will readily appreciate that the hydrostatic-like pressure application enabled by compliant layers 108 results in high quality bond-lines between components of fan blade 102, e.g. blade body 114, blade cover 116 and blade sheath 118. The even distribution of pressure tends to reduce local pressure discontinuities during assembly that can otherwise be caused by potential variations between different fan blades 102. Those having skill in the art will readily appreciate that compliant layers 108 can be positioned on fan blade 102 components before they are placed onto die base 106 or compliant layers 108 can already be positioned on die base 106 and/or plunger 104.

With continued reference to FIG. 3, the method includes positioning blade body 114 with cover 116 and blade sheath 118 on die base 106, i.e. prior to applying plunger 104. The method optionally includes applying pressure with cam mechanism 110 to a trailing edge side 126 of blade body 114 in a chord-wise direction for full engagement of leading edge 124 of blade body 114 within blade sheath 118. Those skilled in the art will readily appreciate that this substantially ensures proper sheath placement without complicated tooling as used in traditional methods of assembling fan blades.

As shown in FIGS. 1 and 3, pressing blade body 114 together with blade sheath 118 and blade cover 116 includes moving plunger 104 along longitudinal axis A, out of the first position shown in FIG. 1, toward a first broad side 122 of blade body 114, to a second position, shown in FIG. 3. Pressing blade body 114 together with blade sheath 118 and/or blade cover 116 also includes transferring pressure, e.g. applying a load, from a plunger surface 128 to first broad side 122 of blade body 114 in a plane substantially normal to first broad side 122 of blade body 114. Die base 106 supports blade body 114, blade cover 116 and blade sheath 118 during the pressing of blade body 114 and blade sheath 118 and blade cover 116. The method also includes constraining blade body 114 and blade sheath 118 with a flexible stopper 112 proximate leading edge 124 of blade body 114. While plunger 104 is shown and described as moving downward along longitudinal axis A, those skilled in the art will readily appreciate that die base 106 can also move along longitudinal axis A upward toward plunger 104.

The method also includes transferring heat from plunger 104 and die base 106 to blade body 114, blade sheath 118 and blade cover 116 to cure adhesive 120, as discussed above. Those skilled in the art will readily appreciate that transferring heat from plunger 104 and die base 106 to fan blade 102 can include transferring heat through conduction, enabling faster heat transfer increases or decreases resulting in increased control over the heat transfer as compared with traditional methods of assembly. Further, it is contemplated that plunger 104 and die base 106 can be kept at a temperature above ambient temperature in order to reduce heat-up time, as compared with traditional methods of assembly. Those skilled in the art will readily appreciate that both the conductive heating and the ability to keep plunger 104 and die base 106 at an elevated temperature can result in reduced manufacturing cycle time as compared with traditional methods of assembly.

Those skilled in the art will also readily appreciate that that there can be more flexibility in manufacturing due to the one-piece manufacturing flow facilitated by the platen press as opposed to batch processing used in traditional methods of assembly. Further, those skilled in the art will readily appreciate that there is no required nitrogen source like that typically found in traditional assembly methods such as autoclaves.

While shown and described in the exemplary context of fan blades for gas turbine engines, those skilled in the art will readily appreciate that the systems and methods described herein can be used on any other suitable components without departing from the scope of this disclosure. For example, the embodiments described herein can readily be applied to other bonded airfoil assemblies, such as, inlet guide vanes, or the like.

The methods and systems of the present disclosure, as described above and shown in the drawings, provide for improved methods for airfoil assembly. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for assembling an airfoil comprising:
pressing a blade body together with at least one of a blade sheath and a blade cover between a plunger and a die base to join the blade body to at least one of the blade sheath and the blade cover;

applying pressure to a trailing edge side of the blade body in a chord-wise direction with a cam mechanism for full engagement of a leading edge of the blade body within the blade sheath.

2. A method as recited in claim 1, further comprising:
transferring heat from at least one of the plunger and the die base to at least one of the blade body, the blade sheath and the blade cover to cure an adhesive.

3. A method as recited in claim 2, wherein transferring heat from at least one of the plunger and the die base includes transferring heat through conduction.

4. A method as recited in claim 1, further comprising:
applying an adhesive between a leading edge of the blade body at least one of the blade cover and the blade sheath; and
curing the adhesive with heat transferred from at least one of the plunger and the die base.

5. A method as recited in claim 1, further comprising:
positioning a compliant layer between a broad side of the blade body and the plunger, wherein the compliant layer is configured to substantially equalize the distribution of pressure applied by the plunger across the broad side of the blade body.

6. A method as recited in claim 1, further comprising:
positioning a compliant layer between a broad side of the blade body and the die base, wherein the compliant layer is configured to substantially equalize the distribution of pressure across the broad side of the blade body.

7. A method as recited in claim 1, further comprising:
positioning the blade body on the die base, wherein the die base opposes the plunger across the blade body along a longitudinal axis.

8. A method as recited in claim 1, further comprising:
supporting the blade body and at least one of the blade sheath and the blade cover with the die base while pressing the blade body and at least one of the blade sheath and the blade cover.

9. A method as recited in claim 1, wherein pressing the blade body together with at least one of the blade sheath and the blade cover includes moving the plunger along a longitudinal axis toward a broad side of the blade body.

10. A method as recited in claim 1, wherein pressing the blade body together with at least one of the blade sheath and the blade cover includes transferring pressure from a plunger surface to a broad side of the blade body in a plane normal to the broad side of the blade body.

11. A method as recited in claim 1, further comprising:
constraining the blade body and the blade sheath with a flexible stopper proximate a leading edge of the blade body.

12. A method as recited in claim 1, wherein the airfoil is a fan blade.

13. A method as recited in claim 1, wherein foam segments are placed in the cavities prior to the blade cover being joined to the blade body.

14. A method as recited in claim 13, wherein the airfoil is a fan blade.

15. A method as recited in claim 14, further comprising:
transferring heat from at least one of the plunger and the die base to at least one of the blade body, the blade sheath and the blade cover to cure an adhesive.

16. A method as recited in claim 1, further comprising:
applying an adhesive between a broad side of the blade body at least one of the blade cover and the blade sheath; and
curing the adhesive with heat transferred from at least one of the plunger and the die base, wherein the airfoil is a fan blade.

17. A method as recited in claim 1, wherein the airfoil is a fan blade and wherein foam segments are placed in the cavities prior to the blade cover being joined to the blade body.

* * * * *